July 23, 1963  C. E. RHODES  3,098,985
COMPENSATING MEANS FOR DELAY LINES
Filed May 23, 1961
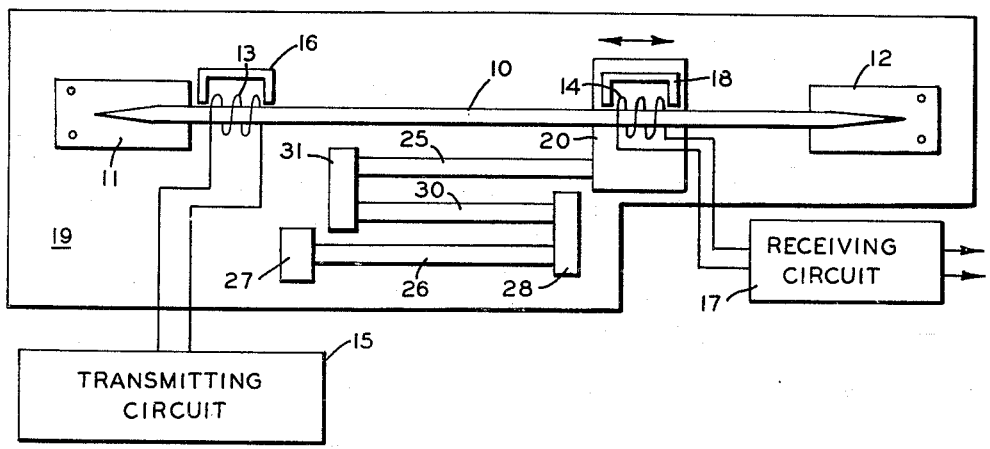
INVENTOR.
CECIL E. RHODES
BY *John P. Chandler*
HIS ATTORNEY.

United States Patent Office 3,098,985
Patented July 23, 1963

3,098,985
COMPENSATING MEANS FOR DELAY LINES
Cecil Earl Rhodes, Brooklyn, N.Y., assignor to Sealectro Corporation, Mamaroneck, N.Y.
Filed May 23, 1961, Ser. No. 111,975
1 Claim. (Cl. 333—30)

This invention relates to a means for compensating a magnetostrictive delay line for temperature changes. The compensating means maintains the delay time at a constant predetermined value over a wide range of temperatures. The invention has particular reference to a temperature-sensitive mechanical device which moves a receiving winding or a transmitting winding along the axis of a magnetostrictive line in response to temperature changes.

Magnetostrictive delay lines employ a line made of nickel or nickel alloy with a transmitting winding around the line at one position and a receiving winding also around the line at a second position, spaced a definite distance from the first position. A current applied to the transmitting winding induces a small mechanical dislocation in the line material. This dislocation travels along the line at about the speed of sound in the material and when its passes the receiving winding a small voltage is induced in the winding which may be transmitted to a load circuit.

Delay lines are subject to variations of delay time when the temperature changes because the length of the supporting base, the modulus of elasticity of the line material, and the density of the line material all change. Some attempts have been made to eliminate some of these changes by using selected materials which change their dimensions a very small amount when the temperature changes. Invar and quartz are two materials which have been used for this purpose. Other attempts at delay-time stabilization have employed an enclosure for the line which is maintained at a definite unvarying temperature. However, this arrangement is expensive and requires many additional control units.

The present invention compensates for a change in delay time by a mechanical movement of the receiving winding or the transmitting winding along the axis of the line. The movement is just enough to maintain the delay time at its predetermined value. The mechanical temperature-sensitive devices used for this purpose are entirely automatic and require no manual control.

One of the objects of this invention is to provide a compensating means for magnetostrictive delay lines which avoids one or more of the disadvantages and limitations of prior art devices.

Another object of the invention is to provide a completely automatic compensation system for a magnetostrictive delay line which operates without the need of manual adjustment or supervision.

Another object of the invention is the operation of a delay line compensation means without the provision of applied power, either electrical or mechanical.

The invention comprises a magnetostrictive delay line having a transmitting winding and a receiving winding spaced along the line at a distance corresponding to a predetermined desired time interval. Mechanical devices which are temperature-sensitive are secured to the receiving winding support, the transmitting winding support, or to both, and vary the distance between windings in response to the variations in ambient temperature.

For a better understanding of the present invention, together with other and further objects thereof, reference is made to the following description taken in connection with the accompanying drawings.

The FIGURE is a schematic diagram of connections showing the magnetostrictive line, the transmitting winding and the receiving winding, the latter being movable along the axis of the line in response to temperature changes.

The figure is a view showing a specific means for moving the receiving winding in response to temperature changes and comprising a composite array of brass rods and a rod of a material which does not expand or contract with changes of temperature.

The drawing shows a magnetostrictive line 10 terminated at each end by reflection absorbing materials 11 and 12. A transmitting winding 13 is positioned near one end of the line for transmitting mechanical waves to the line for propagation toward a receiving winding 14. The transmitting winding 13 is connected to a transmitting circuit 15 and the magnetism induced in the line 10 is supplemented by a biasing permanent magnet 16. In a similar manner the receiving winding 14 is connected to a receiving circuit 17 which may be employed to amplify the received pulse and send it to a wire transmission line or to a radio transmitting station. Receiving winding 14 is also supplemented by a permanent magnet 18 which biases the magnetic flux in the line. Ends 11 and 12 are supported on a base member 19.

The receiving winding 14 and magnet 18 are mounted on a movable base 20 which is adapted to move in either direction along the axis of the line for compensation purposes as indicated by the arrow.

The temperature compensating means includes a plurality of parallel rods which may be made of brass or aluminum or any other substance which has a large coefficient of thermal expansion. Between these metallic rods is a rod which is insensitive to temperature changes. The length of the metal rods is selected so that their expansion and contraction compensates for the variation in time delay of the magnetostrictive line 10 and maintains the delay time at a constant value.

The figure shows the specific two stage device for moving the base 20 and its winding 14 along the line 10 by means of a first brass strip 25 and a second brass strip 26. Strip 26 is secured in fixed relation to a bracket 27 mounted on base 19 and is terminated at its other end by a coupling bar 28. The coupling bar 28 moves a rod of Invar 30 which is secured to a second coupling 31. Strip 25 is secured to bar 31 and the base 20. When the temperature changes strips 25 and 26 change their length but rod 30 is insensitive to temperature changes, and therefore the total movement of base 20 is twice what would be the case if only a single brass bar were used.

From the above description and drawings it will be obvious that a novel system of compensating for temperature changes in a magnetostrictive line has been described.

The foregoing disclosure and drawings are merely illustrative of the principles of this invention and are not

I claim:

A temperature compensated magnetostrictive delay line comprising; a magnetostrictive system including a transmitting winding connected to a transmitting circuit, a receiving winding connected to a utilization circuit, a magnetostrictive line supported on a base and magnetically coupled to both of said windings which are separated by a distance along said line, and a metal rod assembly connected between the receiving winding and the base, said assembly including a plurality of metal rods coupled in end to end relationship, one end of said assembly secured to the base and the other end secured to one of said windings, said assembly positioned so that all of said rods are substantially parallel to said line and adapted to expand and contract in a linear direction to vary the distance between windings in response to temperature changes.

References Cited in the file of this patent
UNITED STATES PATENTS

| | | |
|---|---|---|
| 2,760,165 | Sullivan | Aug. 21, 1956 |
| 2,814,793 | Bonn | Nov. 26, 1957 |
| 2,863,120 | Powell | Dec. 2, 1958 |
| 2,982,925 | Barrow et al. | May 2, 1961 |